L. B. LAWRENCE & A. G. STRAWBRIDGE.
Water-Lifter.

No. 215,525. Patented May 20, 1879.

Witnesses
Geo. H. Strong
Frank A. Brooks

Inventor
L. B. Lawrence
A. G. Strawbridge
By Dewey & Co.
Attys

UNITED STATES PATENT OFFICE.

LORENZO B. LAWRENCE, OF MONTICELLO, CALIFORNIA, AND ALFRED G. STRAWBRIDGE, OF SHARON, PENNSYLVANIA.

IMPROVEMENT IN WATER-LIFTERS.

Specification forming part of Letters Patent No. 215,525, dated May 20, 1879; application filed February 19, 1879.

*To all whom it may concern:*

Be it known that we, LORENZO B. LAWRENCE, of Monticello, county of Napa, and State of California, and ALFRED G. STRAWBRIDGE, of Sharon, State of Pennsylvania, have invented a Water-Lifter; and we hereby declare the following to be a full, clear, and exact description thereof.

Our invention relates to a novel apparatus for lifting water by means of the pressure of a column of air in excess of what is needed to drive the hot-air engine by which the column of air is compressed, or, in other words, the whole power of the engine is employed to compress air, a small portion of which is carried to the heating-furnace and expanded to drive the engine, while the remainder is carried to the apparatus where it is to be applied to the raising of water, as will be more fully described by reference to the accompanying drawings, in which—

Figure 1:
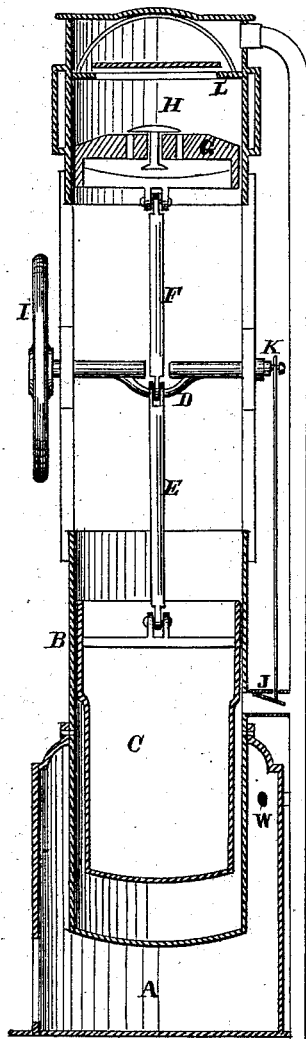
Figure 2:
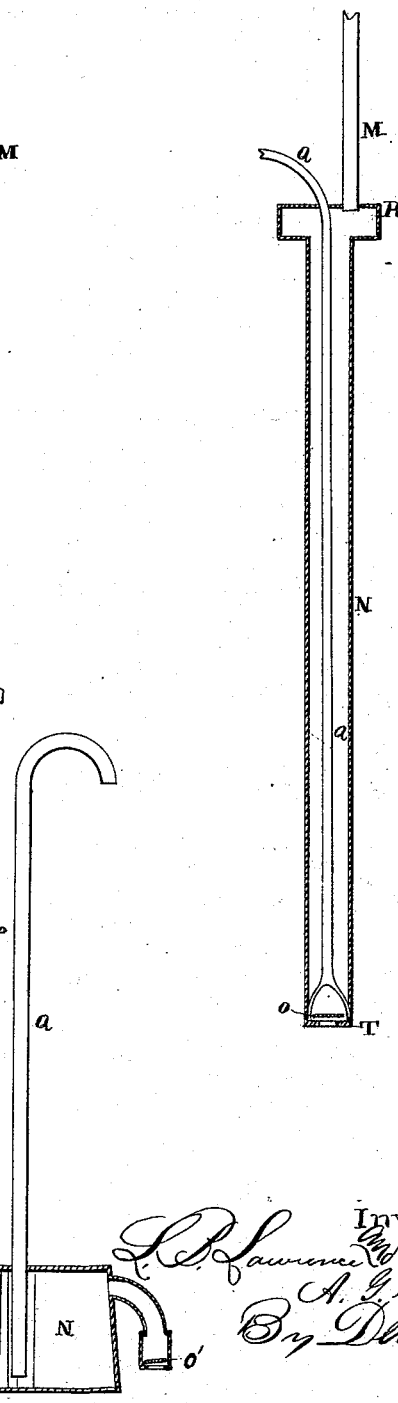

Figure 1 is a sectional elevation of our apparatus. Fig. 2 shows a modification of our apparatus in connection with an artesian-well tube.

A is the furnace or heater of a hot-air engine. B is the working-cylinder, and C is the plunger or piston, which is connected with the crank D by a pitman, E. A second pitman, F, connects this crank with the piston or plunger G of the air-pump H. A fly-wheel, I, upon the crank-shaft serves to give regularity to the motion. The cylinder where it enters the heater A is a little larger than where the plunger works, so that when the plunger descends into it a small space will be left surrounding the plunger as well as below it, to receive the charge of air to be heated and serve as a motor.

The cylinder is preferably made in two parts bolted together by means of flanges, so that if the lower part beomes destroyed by heat it can be easily replaced. Air to drive the piston is admitted through the pipe J by means of a valve worked by an eccentric, K. The air-pump H is made of large diameter, so as to employ the whole power of the engine, and it has a diaphragm, L, with a large valve, through which the air compressed by the piston G passes into the chamber above. It is surrounded by a water-jacket to cool the condensed air. The inlet-valve is formed in the piston, the lower part of the cylinder being open. From the upper part of the compressor-cylinder a pipe, M, leads downward to the tank or chamber N, which may be situated at any desired distance from the engine and compressor. The supply of air for the engine is taken from the pipe M by the pipe J, as before described.

The tank N has an inlet-pipe and a valve, O', through which the chamber is filled by gravitation, the tank being preferably set below the level of the water which supplies it. A discharge-pipe, Q, reaches nearly to the bottom of the tank and extends to any desired point. The air-pipe M just enters the top of the tank, as shown, and the pressure of the air thus exerted will elevate the water. In practice we design to employ two tanks with a valve between them, by which the pressure of the air-column in the pipe M will be transferred from one tank when emptied to the other, which has meanwhile been filled by the water rushing in through the valve O'. Any of the well-known forms of automatic valves may be employed between the tanks and the pipe M.

When our apparatus is to be employed in connection with an artesian well, where the water rises in the pipe, we make the pipe serve as the tank N, as shown in Fig. 2. A cap, R, is fitted to the top of the pipe. The air-pipe M enters this cap, as shown. The discharge-pipe Q has a yoke at its lower end, and the bottom of this yoke supports a diaphragm or partition, T, in which is a valve which answers the same purpose as the valve O' of the tank.

It will be manifest that the water will rise through the valve as high as its natural pressure will carry it. The pressure of the air from the pipe M will thus close the valve O and cause the water to rise through the discharge-pipe, this action being repeated as often as the pipe will fill or as may be needed.

It will in some cases be advisable to so construct the apparatus that it may be detached from the engine. In such a case the pitman F should be disconnected from the piston G, and another pitman (not shown) takes its place. This last pitman is attached to a lever, the opposite end of which extends out beyond the side of the cylinder, and may have a rod connecting it with a windmill, so that the air for working may be supplied without an expense for fuel, the advantage being that the water-lifter can be situated at a considerable distance from the source of power in either case.

The top of the air pump or compressor is flanged on, so as to be easily removed when necessary to get at the interior.

The exhaust-port W of the engine-cylinder is controlled by the same valve-gear which admits the air to the cylinder.

Having thus described our invention, what we claim as new, and desire to secure by Letters Patent, is—

1. The apparatus consisting of the hot-air engine A B C, in combination with the air-compressing cylinder H, of large size, and the pipes M and J, whereby a sufficient amount of air is carried to the engine and a surplus provided for lifting water, substantially as herein described.

2. The hot-air engine A B C and the air-compressing cylinder H, so formed as to supply an excess of air, and the conveying-pipe M, in combination with the tank or pipe N, the supply-valve, and the discharge-pipe Q, substantially as and for the purpose herein described.

3. A water-lifting apparatus consisting essentially of the closed tank or pipe N, with its ingress-valve, discharge-pipe Q, and air-pressure supply-pipe M, in combination with the hot-air engine A B C and the air-compressing cylinder H, whereby the air to drive the engine and to lift the water is compressed at one and the same operation, substantially as herein described.

In witness whereof we have hereunto set our hands.

LORENZO B. LAWRENCE.
ALFRED G. STRAWBRIDGE.

Witnesses:
GEO. H. STRONG,
FRANK A. BROOKS.